United States Patent
Minoura et al.

(10) Patent No.: US 9,556,532 B2
(45) Date of Patent: Jan. 31, 2017

(54) DIE, PROCESS FOR PRODUCING DIE, AND PROCESS FOR PRODUCING ANTIREFLECTION FILM

(75) Inventors: Kiyoshi Minoura, Osaka (JP); Akinobu Isurugi, Osaka (JP); Ichirou Ihara, Osaka (JP); Hidekazu Hayashi, Osaka (JP); Kenichiro Nakamatsu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 979 days.

(21) Appl. No.: 13/582,033

(22) PCT Filed: Mar. 22, 2011

(86) PCT No.: PCT/JP2011/056832
§ 371 (c)(1),
(2), (4) Date: Aug. 30, 2012

(87) PCT Pub. No.: WO2011/125486
PCT Pub. Date: Oct. 13, 2011

(65) Prior Publication Data
US 2012/0318772 A1  Dec. 20, 2012

(30) Foreign Application Priority Data
Mar. 31, 2010 (JP) .................. 2010-082955

(51) Int. Cl.
*C25D 11/12* (2006.01)
*C25D 11/24* (2006.01)
(Continued)

(52) U.S. Cl.
CPC ............. *C25D 11/12* (2013.01); *C25D 11/045* (2013.01); *C25D 11/24* (2013.01); *G02B 1/118* (2013.01);
(Continued)

(58) Field of Classification Search
CPC ....... C25D 11/12; C25D 11/045; C25D 11/24; G02B 1/118
See application file for complete search history.

(56) References Cited

U.S. PATENT DOCUMENTS 6,359,735 B1  3/2002  Gombert et al.
8,580,135 B2  11/2013  Hayashi et al.
(Continued)

FOREIGN PATENT DOCUMENTS

CN  101835925 A  9/2010
EP    2210970 A1  7/2010
(Continued)

OTHER PUBLICATIONS

International Preliminary Report on Patentability dated Nov. 22, 2012.
(Continued)

*Primary Examiner* — Bryan D. Ripa
(74) *Attorney, Agent, or Firm* — Harness, Dickey & Pierce, P.L.C.

(57) ABSTRACT

A method is provided for manufacturing a mold that has a porous alumina layer over its surface, which is capable of preventing formation of pits (recesses). A moth-eye mold manufacturing method of an embodiment of the present invention is a method for manufacturing a mold which has a porous alumina layer over its surface, including the steps of: providing a mold base which includes an aluminum base and an aluminum film deposited on a surface of the aluminum base, the aluminum film having a purity of not less than 99.99 mass %; anodizing a surface of the aluminum film to form a porous alumina layer which has a plurality of minute recessed portions; and bringing the porous alumina layer into contact with an etching solution to enlarge the plurality of minute recessed portions of the porous alumina layer.

12 Claims, 9 Drawing Sheets

(51) Int. Cl.
  *G02B 1/118* (2015.01)
  *C25D 11/04* (2006.01)
  *B29C 59/04* (2006.01)
  *B29C 35/08* (2006.01)

(52) U.S. Cl.
  CPC ...... *B29C 59/046* (2013.01); *B29C 2035/0827* (2013.01)

(56) References Cited

U.S. PATENT DOCUMENTS

| | | | |
|---|---|---|---|
| 9,193,096 B2 | 11/2015 | Isurugi et al. | |
| 2003/0175472 A1 | 9/2003 | Den et al. | |
| 2003/0205475 A1* | 11/2003 | Sawitowski | B22C 9/061 205/70 |
| 2006/0172116 A1 | 8/2006 | Den et al. | |
| 2007/0159698 A1* | 7/2007 | Taguchi et al. | 359/586 |
| 2010/0243458 A1* | 9/2010 | Kojima | B29C 33/38 205/50 |
| 2010/0258978 A1* | 10/2010 | Yamada | B29C 59/04 264/293 |
| 2012/0018613 A1 | 1/2012 | Hayashi et al. | |
| 2013/0004612 A1 | 1/2013 | Isurugi et al. | |

FOREIGN PATENT DOCUMENTS

| | | |
|---|---|---|
| EP | 2418305 A1 | 2/2012 |
| EP | 2540469 A1 | 1/2013 |
| JP | 58217697 A | 12/1983 |
| JP | 2001517319 A | 10/2001 |
| JP | 2003531962 A | 10/2003 |
| JP | 2003342791 A | 12/2003 |
| JP | 2004107770 A * | 4/2004 |
| JP | 2004107770 A | 4/2004 |
| JP | 2005156695 A | 6/2005 |
| KR | 20100084161 A | 7/2010 |
| WO | WO-2006059686 A1 | 6/2006 |
| WO | WO-2009/054513 A1 | 4/2009 |
| WO | WO-2010116728 A1 | 10/2010 |
| WO | WO-2011/105206 A1 | 9/2011 |

OTHER PUBLICATIONS

International Search Report.
Written Opinion of International Searching Authority.

* cited by examiner (a)

(b)

(c)

(d)

(e)

(a)

(b)

(a)

(b)

(a)  (b)

(a)  (b)

(c)

DIE, PROCESS FOR PRODUCING DIE, AND PROCESS FOR PRODUCING ANTIREFLECTION FILM

TECHNICAL FIELD

The present invention relates to a mold, a mold manufacturing method, and an antireflection film production method. In this specification, the "mold" includes molds that are for use in various processing methods (stamping and casting), and is sometimes referred to as a stamper. The "mold" can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum (Al) has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The applicant of the present application discloses, in Patent Document 4, the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 µm and less than 100 µm. The entire disclosures of Patent Documents 1, 2, and 4 are herein incorporated by reference.

Utilizing an anodized porous aluminum film can facilitate the manufacture of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film production method with the use of a moth-eye mold uses a photocurable resin. Firstly, a photocurable resin is applied over a substrate. Then, an uneven surface of a moth-eye mold which has undergone a mold release treatment is pressed against the photocurable resin in vacuum. Thereafter, the uneven structure is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of producing an antireflection film with the use of the photocurable resin is disclosed in, for example, Patent Document 4.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

SUMMARY OF INVENTION

Technical Problem

The present inventor attempted to manufacture a moth-eye mold by performing anodization and etching on a surface of a cylinder of bulk aluminum such that a porous alumina layer is formed. To obtain sufficient rigidity in the moth-eye mold, an aluminum cylinder which contains an impurity element (e.g., JIS 1050 (aluminum purity: 99.50 mass % or higher)) was used, but pits (e.g., about 1 μm in diameter), which were greater than micropores that formed an inverted moth-eye structure (about several hundreds of nanometers in diameter), were formed in some cases. The pits are formed due to a local cell reaction which is caused in the etching step between an impurity which is present inside the aluminum cylinder and an aluminum portion surrounding the impurity. The aluminum is anodically dissolved due to the local cell reaction, whereby the pits are formed.

This problem is not limited to the moth-eye mold but is a common problem among molds which have a porous alumina layer over their surfaces.

One of the major objects of the present invention is to provide a method for manufacturing a mold that has a porous alumina layer over its surface, which is capable of preventing formation of pits.

Solution to Problem

A mold manufacturing method of the present invention is a method for manufacturing a mold which has a porous alumina layer over its surface, including the steps of: (a) providing a mold base which includes an aluminum base and an aluminum film deposited on a surface of the aluminum base, the aluminum film having a purity of not less than 99.99 mass %; (b) after step (a), anodizing a surface of the aluminum film to form a porous alumina layer which has a plurality of minute recessed portions; and (c) after step (b), bringing the porous alumina layer into contact with an etching solution to enlarge the plurality of minute recessed portions of the porous alumina layer.

In one embodiment, the step (b) includes, when the aluminum film has a vacancy between crystal grains, anodizing part of the surface of the aluminum base lying under the vacancy between crystal grains, thereby forming an anodized film in the part.

In one embodiment, the surface of the aluminum base is a surface cut with a bit.

In one embodiment, the aluminum base is a cylindrical aluminum pipe.

In one embodiment, an aluminum purity of the aluminum base is not less than 99.50 mass % and less than 99.99 mass %.

Another mold manufacturing method of the present invention is a method for manufacturing a mold which has a porous alumina layer over its surface, including the steps of: (a) providing a mold base which includes a metal base, an inorganic material layer provided on a surface of the metal base, and an aluminum film deposited on the inorganic material layer, the aluminum film having a purity of not less than 99.99 mass %; (b) after step (a), anodizing a surface of the aluminum film to form a porous alumina layer which has a plurality of minute recessed portions; and (c) after step (b), bringing the porous alumina layer into contact with an etching solution to enlarge the plurality of minute recessed portions of the porous alumina layer.

In one embodiment, the metal base is an aluminum base.

In one embodiment, the step (b) includes, when the aluminum film has a vacancy between crystal grains, the inorganic material layer has a pinhole, and the vacancy between crystal grains and the pinhole overlap each other in terms of a thickness direction, anodizing part of the surface of the metal base lying under the vacancy between crystal grains and the pinhole, thereby forming an anodized film in the part.

In one embodiment, the inorganic material layer has a thickness of not less than 500 nm.

In one embodiment, the surface of the metal base is a surface cut with a bit.

In one embodiment, the metal base has a cylindrical shape.

In one embodiment, the porous alumina layer has a plurality of recessed portions whose two-dimensional size viewed in a direction normal to its surface is not less than nm and less than 500 nm, the method further includes, after step (c), the step (d) of further performing anodization to grow the plurality of minute recessed portions, and after step (d), step (c) and step (d) are further performed.

A mold of the present invention is a mold manufactured according to any of the manufacturing methods as set forth above, the mold including a porous alumina layer which has an inverted moth-eye structure over its surface, the porous alumina layer having a plurality of recessed portions whose two-dimensional size viewed in a direction normal to its surface is not less than 50 nm and less than 500 nm.

An antireflection film manufacturing method of the present invention is a method for producing an antireflection film, including the steps of: providing the mold as set forth above and a work; and irradiating a UV-curable resin provided between the mold and a surface of the work with ultraviolet light, thereby curing the UV-curable resin.

Advantageous Effects of Invention

According to the present invention, a method for manufacturing a mold that has a porous alumina layer over its surface is provided, which is capable of preventing formation of pits.

DESCRIPTION OF EMBODIMENTS

Hereinafter, a mold and a mold manufacturing method of an embodiment of the present invention are described with reference to the drawings. However, the present invention is not limited to the embodiment which will be exemplified below.

According to a mold manufacturing method of an embodiment of the present invention, anodization and etching are performed on a mold base which includes an aluminum base and an aluminum film deposited on a surface of the aluminum base, the aluminum film having a purity of not less than 99.99 mass %. By using this mold base, formation of pits can be prevented. Here, the mold base refers to an object of the anodization and the etching in the mold manufacturing process. The aluminum base refers to aluminum in bulk which is self-supporting and which is in the form of a plate, a circular cylinder, or a circular column. In manufacture of a mold of an embodiment of the present invention, in order to obtain a mold which has sufficient rigidity, the aluminum base used is an aluminum base which contains an impurity element such that the aluminum purity is not less than 99.50 mass % and less than 99.99 mass %.

Figure 4:
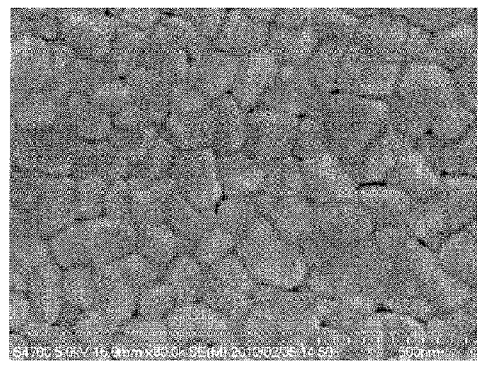
FIG. 4 A SEM image of a surface of an aluminum film 18.

The deposited aluminum film is formed by a large number of crystal grains and has vacancies between the crystal grains (see FIG. 4). According to the researches conducted by the present inventor, the size of the crystal grains and the distance between the vacancies varied depending on the deposition conditions and, however, the vacancies were not removed. Therefore, it was expected that, even when an aluminum film of high purity is deposited on an aluminum base, an etching solution should enter through the vacancies between the crystal grains, leading to formation of pits. However, contrary to the expectation, performing anodization and etching on the above mold base did not lead to formation of pits. This is believed to be because the probability that impurities in the aluminum base would be exposed at the vacancies between the crystal grains of the aluminum film was sufficiently low.

According to a mold fabrication method of another embodiment of the present invention, a mold base used further includes an inorganic material layer formed between an aluminum base and an aluminum film. The inorganic material layer does not need to insulate the aluminum base and the aluminum film from each other. Also, the inorganic material layer does not need to be a dense film. In a mold manufactured using the mold base which further includes the inorganic material layer, the inorganic material layer may be used as an etch stop layer. Therefore, this mold has an advantage that it is readily reworkable as will be described later.

Figure 1:
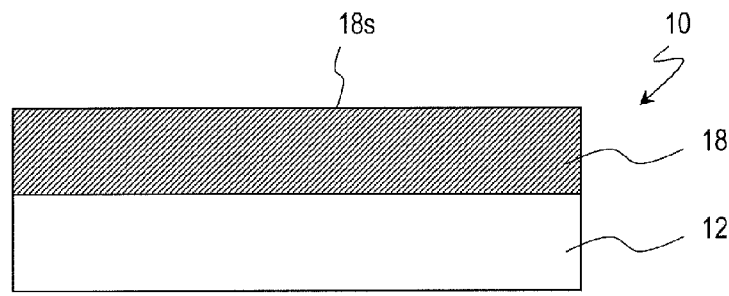
FIG. 1 (*a*) to (*e*) are schematic diagrams for illustrating a mold manufacturing method of an embodiment of the present invention.
Figure 1:
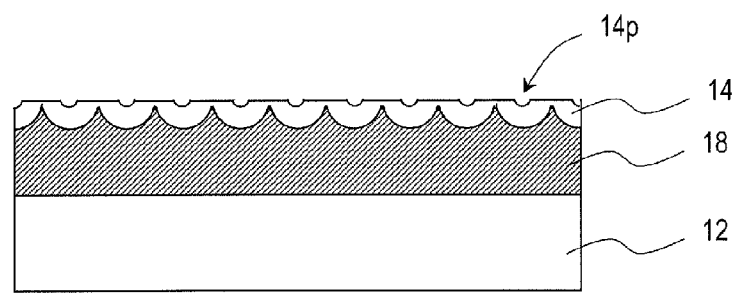
Figure 1:
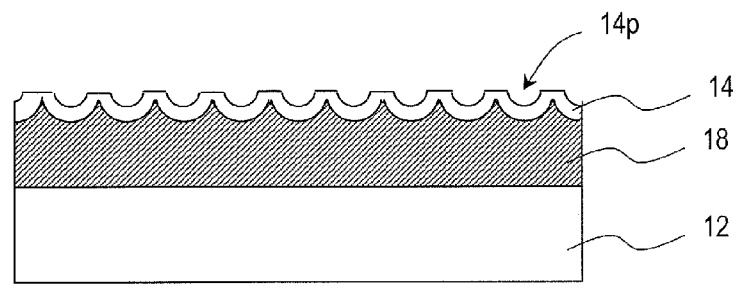
Figure 1:
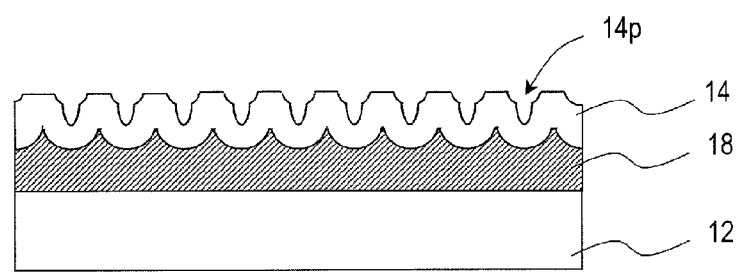
Figure 1:
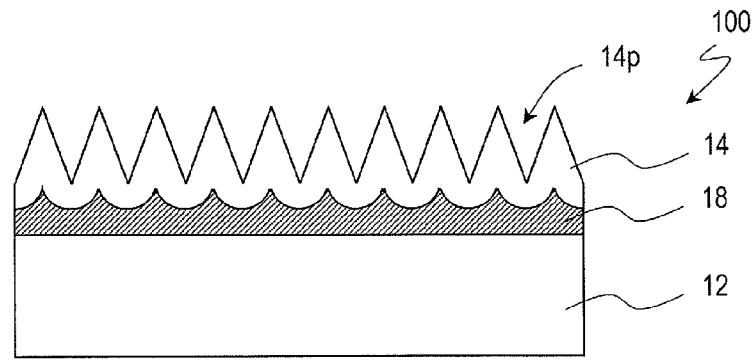

Hereinafter, a mold manufacturing method of an embodiment of the present invention is described with reference to FIGS. 1(*a*) to 1(*e*). FIGS. 1(*a*) to 1(*e*) are schematic cross-sectional views for illustrating the mold manufacturing method of the embodiment of the present invention. Note that the mold manufacturing method of the embodiment of the present invention may be, for example, a method for manufacturing a moth-eye mold which is preferably used for formation of an antireflection film which has a moth-eye structure. Hereinafter, the descriptions will be provided with an example of manufacturing a moth-eye mold.

First, as shown in FIG. 1(*a*), a mold base 10 is provided which includes an aluminum base 12 and an aluminum film 18 deposited on a surface of the aluminum base 12. The aluminum film 18 has a purity of not less than 99.99 mass %. For example, the mold base 10 provided may be realized by forming a 1 μm thick aluminum film 18 on the surface of the aluminum base 12 by means of vacuum evaporation or sputtering. The aluminum base 12 used may be an aluminum base whose aluminum purity is not less than 99.50 mass % and less than 99.99 mass % and which has relatively high rigidity.

The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a circular cylinder is prepared by extrusion, the Mg content is preferably 2.0 mass % or less. If the Mg content exceeds 2.0 mass %, the extrudability deteriorates in general. In the present embodiment, the aluminum base 12 used may be a cylindrical aluminum pipe which is made of, for example, JIS 1050, an Al—Mg based alloy (e.g., JIS 5052), or an Al—Mg—Si based alloy (e.g., JIS 6063).

Then, a surface 18s of the aluminum film 18 is anodized to form a porous alumina layer 14 which has a plurality of micropores 14p (minute recessed portions) as shown in FIG. 1(b). The porous alumina layer 14 includes a porous layer which has the micropores 14p and a barrier layer. The porous alumina layer 14 may be formed by, for example, anodizing the surface 18s in an acidic electrolytic solution. The electrolytic solution used in the step of forming the porous alumina layer 14 may be, for example, an aqueous solution which contains an acid selected from the group consisting of oxalic acid, tartaric acid, phosphoric acid, chromic acid, citric acid, and malic acid. For example, as will be described later in Example 1, the surface 18s of the aluminum film 18 is anodized for 55 seconds using an oxalic acid aqueous solution (concentration: 0.3 wt %, solution temperature: 5° C.) with an applied voltage of 80 V, whereby the porous alumina layer 14 is formed.

Then, the porous alumina layer 14 is brought into contact with an alumina etchant such that a predetermined amount is etched away, whereby the pore diameter of the micropores 14p is increased as shown in FIG. 1(c). By modifying the type and concentration of the etching solution and the etching duration, the etching amount (i.e., the size and depth of the micropores 14p) can be controlled. The etching solution used may be, for example, an aqueous solution of 10 mass % phosphoric acid or organic acid, such as formic acid, acetic acid, citric acid, or the like, or a chromium-phosphoric acid mixture solution. For example, as will be described later in Example 1, the etching is performed for 20 minutes using phosphoric acid (1 mol/L(liter), 30° C.).

Then, the aluminum film 18 is again partially anodized such that the micropores 14p are grown in the depth direction and the thickness of the porous alumina layer 14 is increased as shown in FIG. 1(d). Here, the growth of the micropores 14p starts at the bottoms of the previously-formed micropores 14p, and accordingly, the lateral surfaces of the micropores 14p have stepped shapes.

Thereafter, when necessary, the porous alumina layer 14 may be brought into contact with an alumina etchant to be further etched such that the pore diameter of the micropores 14p is further increased. The etching solution used in this step may preferably be the above-described etching solution. Practically, the same etching bath may be used.

In this way, by alternately repeating the anodization step and the etching step as described above through multiple cycles (e.g., 5 cycles: including 5 anodization cycles and 4 etching cycles), the moth-eye mold 100 that includes the porous alumina layer 14 which has a desired uneven shape is obtained as shown in FIG. 1(e).

Hereinafter, why a moth-eye mold manufacturing method of an embodiment of the present invention enables to prevent formation of the above-described pits is described.

Figure 2:
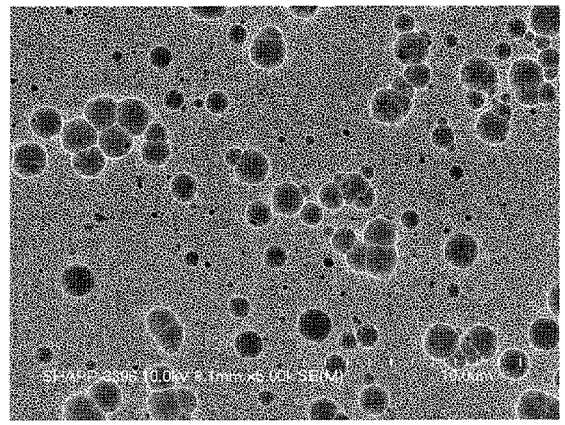
FIG. 2 A SEM image of a surface of a moth-eye mold manufactured using an aluminum base which contains an impurity element.

First, a problem that performing anodization and etching on a surface of the above-described aluminum base that contains an impurity element leads to formation of pits which are larger than the micropores 14p is described. FIG. 2 is a scanning electron microscopic (SEM) image of a surface of a moth-eye mold which was manufactured using an aluminum base that contains an impurity element. The moth-eye mold shown in FIG. 2 was prepared by performing anodization and etching directly on a surface of a JIS 1050 aluminum cylinder. As seen from FIG. 2, the surface of the resultant moth-eye mold has pits (hollows) which have a diameter of about 1 µm, and there are a plurality of minute recessed portions between the pits and in the inner surface of the pits.

Figure 3:
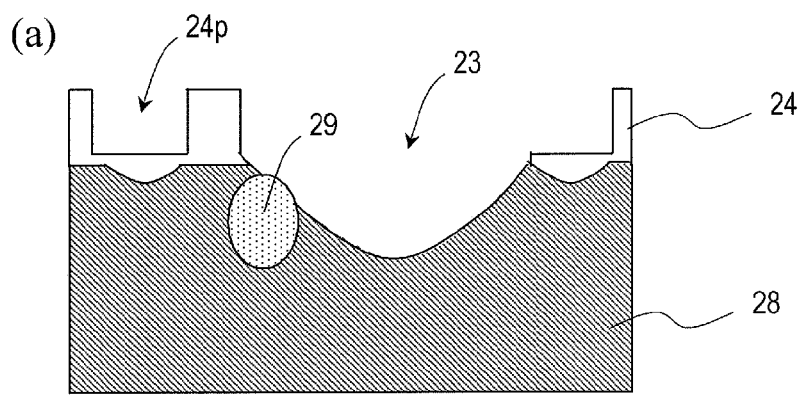
FIGS. 3 (*a*) and (*b*) are schematic diagrams for illustrating a cause of a problem that using an aluminum base which contains an impurity element leads to formation of pits.
Figure 3:
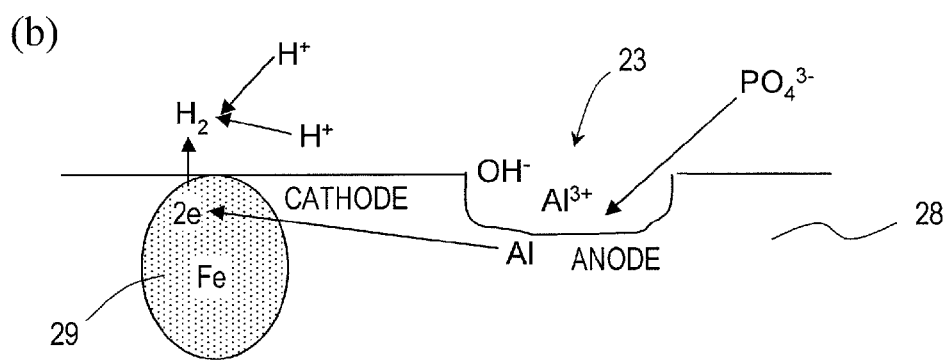

FIG. 3(a) schematically illustrates formation of a pit (hollow) 23 which is larger than a micropore 24p in an etching step that is performed for the purpose of enlarging the micropore 24p after formation of a porous alumina layer (anodized film) 24 with the use of an aluminum base 28 which contains an impurity element 29. The pit 23 is formed in the vicinity of the impurity element 29. It is considered that the pit 23 would be formed by a local cell reaction as shown in FIG. 3(b). For example, if Fe is contained as the impurity element 29, Fe serves as a cathode because the standard electrode potential of Fe (−0.44 V) is higher than that of Al (−1.70 V), and Al is anodically dissolved in the etching solution (also referred to as "galvanic corrosion").

In the moth-eye mold manufacturing method of the embodiment of the present invention, formation of pits can be prevented because a local cell reaction is unlikely to occur as described below.

The aluminum film 18 shown in FIG. 1(a) has vacancies between crystal grains at the surface 18s. FIG. 4 is a SEM image of a surface of the aluminum film 18 which was formed on the surface of the aluminum base 12 by sputtering. As seen from FIG. 4, the surface of the aluminum film 18 has a plurality of vacancies between crystal grains (which are observed as black dots). When the mold base 10 is immersed in an etching solution, the etching solution enters through the vacancies between crystal grains.

A local cell reaction is supposed to occur between metals which have different standard electrode potentials (e.g., between different types of metals). If part of the surface of the aluminum base 12 lying under the vacancies between crystal grains is made of aluminum, no local cell reaction occurs. On the other hand, if an impurity is exposed at part of the surface of the aluminum base 12 lying under the vacancies between crystal grains and the etching solution entering through the vacancies between crystal grains comes into contact with the impurity, there is a probability that a local cell reaction will occur between the impurity and the aluminum film 18.

As will be described later with examples, the present inventor performed anodization and etching on a mold base which has the same configuration as the mold base 10 and found that no pits were formed. This is believed to be because the probability that an impurity would be exposed at part of the surface of the aluminum base 12 lying under the vacancies between crystal grains was sufficiently low. As a result, probably, a local cell reaction did not occur between the impurity and the aluminum film 18. Therefore, in the mold manufacturing method of the embodiment of the present invention, using the mold base 10 reduces the probability of occurrence of a local cell reaction, and thus, formation of pits can be prevented.

As will be described below, in part of the surface of the aluminum base 12 lying under the vacancies between crystal grains, an anodized film is formed in the anodization step, and therefore, a local cell reaction is unlikely to occur.

Figure 5:
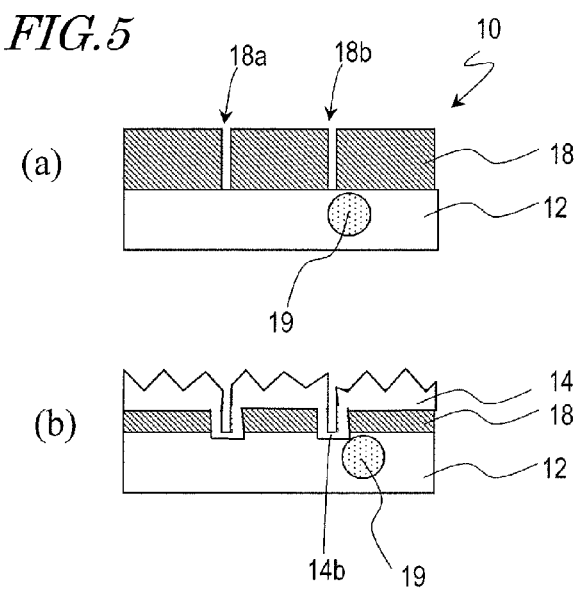
FIG. 5 (*a*) is a schematic diagram of a mold base 10. (*b*) is a schematic diagram showing a state of the mold base 10 after anodization is performed.

As shown in FIG. 5(a), if the aluminum film 18 has vacancies 18a and 18b between a plurality of crystal grains and part of the surface of the aluminum base 12 near the vacancy 18b includes an impurity 19 (e.g., Fe), the etching solution enters through the vacancy 18b in the etching step, and there is a probability that the etching solution will cause a local cell reaction between the impurity 19 and an aluminum portion surrounding the impurity 19 or between the impurity 19 and the aluminum film 18. In the anodization step, part of the surface of the aluminum base 12 lying under the vacancy 18b is brought into contact with the electrolytic solution and anodized, so that an anodized film 14b is formed as shown in FIG. 5(b). Even when the etching solution enters the vacancy 18b, the etching solution would not come into contact with the impurity 19 till the anodized film 14b is dissolved into the etching solution. As a result, a local cell reaction is unlikely to occur.

Since the anodized film 14b is formed in the vacancy 18b, the etching rate of the anodized film 14b is relatively low. For example, the etching rate is lower than at the surface of the porous alumina layer 14. Therefore, the anodized film 14b is less readily resolved.

Further, according to the moth-eye mold manufacturing method of the embodiment of the present invention, as will be described below, when a moth-eye mold is manufactured using a mold base 50 which includes a base 52 that is made of a metal other than aluminum (e.g., a base that is made of stainless steel) and an aluminum film 58 that is formed on the surface of the base 52, a defect which may be caused due to oxygen gas would not be produced.

Figure 6:
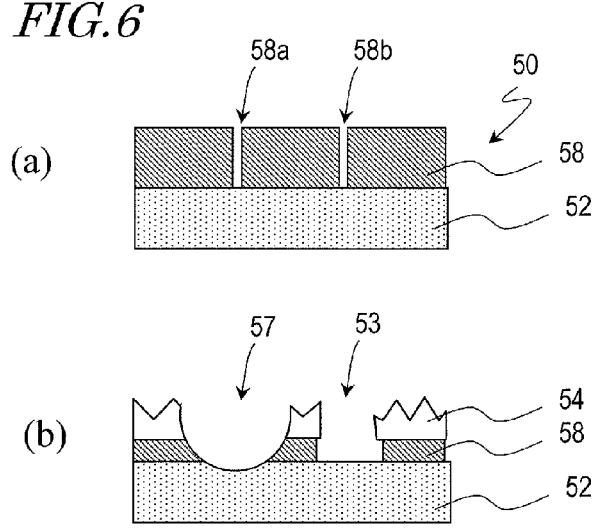
FIG. 6 (*a*) is a schematic diagram of a mold base 50. (*b*) is a schematic diagram showing a state of the mold base 50 after anodization and etching are repeatedly performed.

FIG. 6 schematically shows manufacture of a moth-eye mold with the use of the mold base 50 which includes the base 52 that is made of a metal other than aluminum (here, a base that is made of stainless steel) and the aluminum film 58 that is formed on the surface of the base 52. FIG. 6(a) is a schematic cross-sectional view of the mold base 50. The aluminum film 58 has vacancies 58a and 58b between crystal grains. When the mold base 50 is used, the electrolytic solution enters through the vacancy 58a in the anodization step. When the electrolytic solution comes into contact with the base 52, an oxygen gas is explosively produced, so that a defect 57 of about 1 mm in diameter may be formed in the aluminum film 58 (FIG. 6(b)). This oxygen derives from electrolysis of water. In the moth-eye mold manufacturing method of the embodiment of the present invention, the mold base 10 is used which includes the aluminum base 12 and the aluminum film 18 deposited on a surface of the aluminum base 12. Even when the electrolytic solution comes into contact with the aluminum base 12 in the anodization step, a defect, such as the defect 57 (FIG. 6(b)), would not be formed because oxygen produced by electrolysis of water is bonded to aluminum at the surface of the aluminum base 12.

FIG. 6(b) also shows a pit 53 which was formed in the surface of the mold base 50. When anodization and etching are performed on the mold base 50, the etching solution enters through the vacancy 58b in the etching step and causes a local cell reaction between the base 52 and the aluminum film 58, and as a result, the pit 53 is formed as shown in FIG. 6(b). In the moth-eye mold manufacturing method of the embodiment of the present invention, a pit, such as the pit 53 which is formed when the mold base 50 is used, would not formed for the above reasons.

The aluminum base 12 has a smaller weight than a base which is made of stainless steel, for example. Therefore, the mold base 10 also has another advantage that it can relatively readily be processed. For example, the task of repeating the above-described anodization step and etching step can relatively readily be carried out. Particularly, in the case of manufacturing a moth-eye mold which is for use in production of a large-surface antireflection film, a mold and a mold base are large. Therefore, using the mold base 10 is advantageous.

According to the moth-eye mold manufacturing method of the embodiment of the present invention, the micropores can be formed without variation in diameter or depth as compared with a case where a moth-eye mold is manufactured by performing the anodization and the etching directly on a surface of an aluminum base.

Figure 7:
FIG. 7 A SEM image of a surface of an aluminum base.

The present inventor performed the anodization and the etching directly on a surface of an aluminum base and found that there was a variation in diameter or depth of micropores of a porous alumina layer in some cases. It is estimated that the variation in diameter or depth of the micropores is attributed to the surface condition of the aluminum base. There are a plurality of crystal grains in the surface of the aluminum base. FIG. 7 shows an optical microscopic image (differential interference image) of the surface of the aluminum base. As seen from FIG. 7, there are a plurality of crystal grains in the surface of the aluminum base. The diameter of the plurality of crystal grains is from about several hundreds of micrometers to about 20 mm. At the surface of the aluminum base, exposed crystal planes are different among the crystal grains.

Figure 8:
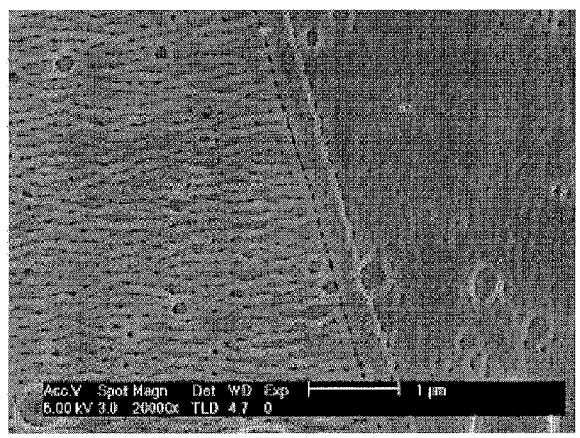
FIG. 8 A SEM image of a surface of a moth-eye mold of Comparative Example 1.

FIG. 8 is a SEM image of part of a surface of a moth-eye mold that was manufactured by anodizing and etching a surface of an aluminum base (a moth-eye mold of Comparative Example 1 which will be described later) in which there is a grain boundary of the aluminum base. In the region shown in FIG. 8, a grain boundary extends at the center of the surface of the aluminum base. As seen from FIG. 8, comparing the regions on the left side and the right side of the grain boundary, the diameter of the micropores formed in the region on the left side of the grain boundary (which are observed as black dots in FIG. 8) is greater than that of the micropores formed in the region on the right side of the grain boundary. The depth of the micropores was also different between the region on the left side of the grain boundary and the region on the right side.

Figure 9:
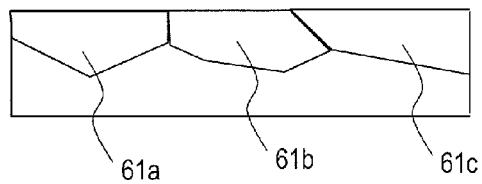
FIG. 9 (*a*) is a schematic diagram of an aluminum base 62. (*b*) is a schematic diagram of a moth-eye mold 300.
Figure 9:
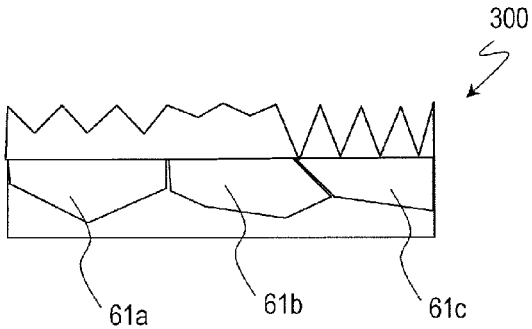

It is estimated that the above result is attributed to a cause which is described hereinafter. FIG. 9(a) schematically shows a cross section of an aluminum base 62. FIG. 9(b) schematically shows a cross section of a moth-eye mold 300 which was manufactured by anodizing and etching a surface of the aluminum base 62. As shown in FIG. 9(a), there are a plurality of crystal grains 61a to 61c in the surface of the aluminum base 62, and exposed crystal planes are different among the crystal grains. When the crystal planes are different, the surfaces have different chemical properties, and accordingly, the anodization rate and the etching rate vary among the crystal grains. Therefore, it is estimated that the diameter or depth of micropores formed in the surfaces of the crystal grains is different among the crystal grains 61a to 61c as shown in FIG. 9(b). Thus, the surface of the aluminum base 62 includes regions among which the anodization rate and the etching rate are different. This may be the reason that the micropores were varying in diameter or depth. In Comparative Example 1 (FIG. 8), it is estimated that, the anodization rate and the etching rate were varying among the crystal grains, and therefore, the micropores formed in the regions on the left side and the right side of the grain boundary had different diameters and different depths as shown in FIG. 8.

Crystal grains which are present at a surface of a deposited aluminum film, such as those in the aluminum film 18 of the mold base 10, are smaller than crystal grains which are present at a surface of the aluminum base 12. The crystal planes exposed at the surface 18s of the aluminum film 18 are relatively random. Thus, the diameter and the depth of the micropores are random, so that the variation in diameter or depth of the micropores is not conspicuous.

Figure 10:
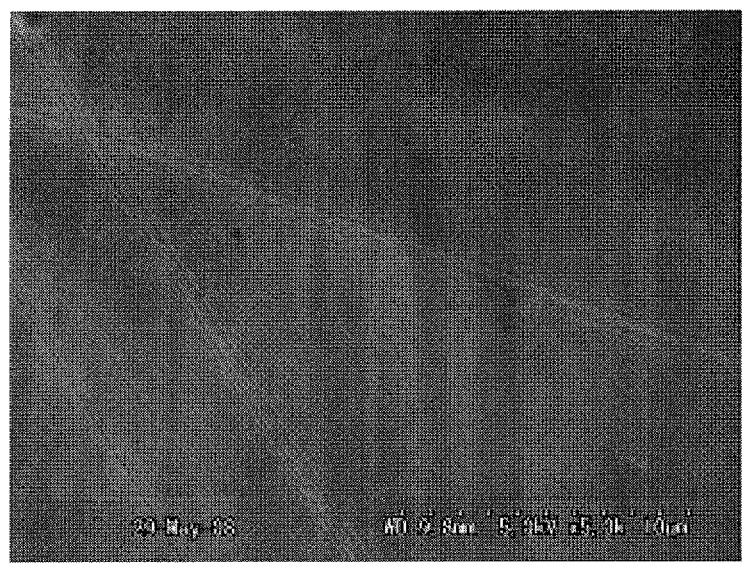
FIG. 10 A SEM image of a surface of an aluminum base.

It is also estimated that the above-described variation in diameter or depth of the micropores can be caused due to differences in chemical properties between part of the surface of the aluminum base which has cutting traces or polishing traces and the other part. FIG. 10 is a SEM image of part of a buffed surface of an aluminum base which has polishing traces. Over the surface of the aluminum base, stripes of polishing traces such as seen in FIG. 10 were observed. The surface 18s of the aluminum film 18 does not have a polishing trace or cutting trace such as those seen in the surface of the aluminum base. Therefore, a variation is unlikely to occur in diameter or depth of the micropores.

As will be described later with examples, the surface of the aluminum base 12 is preferably a surface cut with a bit because the above-described variation in diameter or depth of the micropores is reduced. If the surface condition of the aluminum base 12 is bad (for example, the surface has machining traces (polishing traces or cutting traces) or the surface has remaining abrasive particles used for machining), a surface of an aluminum film deposited on the surface of the aluminum base has an roughened structure in which the surface state of the aluminum base is reflected. If the surface of the aluminum film has a roughened structure, the anodization rate and the etching rate vary depending on the roughened structure. Therefore, a variation in diameter or depth of the micropores is likely to be caused. An aluminum base which is cut with a bit has a better surface condition than a base which is machined with abrasive particles, such as buffing, and therefore, the variation in diameter or depth of the micropores can be reduced.

Next, a moth-eye mold manufacturing method of another embodiment of the present invention is described with reference to FIG. 11. The moth-eye mold manufacturing method of the present embodiment uses a mold base 10b (FIG. 11(a)) as the mold base. The mold base 10b includes an aluminum base 12, an inorganic material layer 16 formed on a surface of the aluminum base 12, and an aluminum film 18 deposited on the inorganic material layer 16. The purity of the aluminum film 18 is not less than 99.99 mass %. The moth-eye mold manufacturing method of the present embodiment is different from the moth-eye mold manufacturing method of the embodiment that has previously been described with reference to FIG. 1 in that the mold base 10b is used, in place of the mold base 10 (FIG. 1(a)), which further includes the inorganic material layer 16 provided between the aluminum base 12 and the aluminum film 18.

First, as shown in FIG. 11(a), the mold base 10b is provided which includes the aluminum base 12, the inorganic material layer 16 provided on the surface of the aluminum base 12, and the aluminum film 18 that is deposited on the inorganic material layer 16 and that has a purity of not less than 99.99 mass %. The material of the inorganic material layer 16 may be, for example, $SiO_2$ or $Ta_2O_5$. The inorganic material layer 16 can be formed by, for example, sputtering.

Then, a surface of the aluminum film 18 is anodized to form a porous alumina layer 14 which has a plurality of minute recessed portions 14p as shown in FIG. 11(b).

Then, the porous alumina layer 14 is brought into contact with the etching solution, whereby the plurality of minute recessed portions 14p of the porous alumina layer 14 are enlarged as shown in FIG. 11(c).

Then, the minute recessed portions 14p are grown in the depth direction while the thickness of the porous alumina layer 14 is increased as shown in FIG. 11(d). Then, when necessary, the anodization and the etching are repeated, whereby a moth-eye mold 100b (FIG. 11(e)) is obtained.

In the moth-eye mold manufacturing method of the present embodiment, as in the moth-eye mold manufacturing method of the embodiment that has previously been described with reference to FIG. 1, a local cell reaction is unlikely to occur, so that formation of pits is prevented.

In the inorganic material layer 16, a pinhole can readily be formed. Particularly when the thickness of the inorganic material layer 16 is relatively small, a pinhole can readily be formed. When a vacancy between crystal grains of the aluminum film 18 and a pinhole overlap each other in terms of a thickness direction, the etching solution enters through the vacancy between crystal grains and the pinhole. If an impurity is exposed in part of the surface of the aluminum base 12 lying under the portion in which the vacancy between crystal grains and the pinhole overlap each other, the entering etching solution comes into contact with the impurity, so that a local cell reaction can be caused between the impurity and the aluminum film 18 or between the impurity and an aluminum portion surrounding the impurity. As described above, it is estimated that, the probability that an impurity will be exposed in part of the surface of the aluminum base 12 lying under the vacancy between crystal grains is sufficiently low. It is also estimated that the probability that an impurity will be exposed under the portion in which the vacancy between crystal grains and the pinhole overlap each other is still lower. Therefore, even when the etching solution enters, the probability that the etching solution will come into contact with the impurity is low, so that a local cell reaction is unlikely to occur.

Part of the surface of the aluminum base 12 lying under the portion in which the vacancy between crystal grains and the pinhole overlap each other is brought into contact with the electrolytic solution in the anodization step. Therefore, an anodized film is formed, and thus, contact between the etching solution and the aluminum base 12 is prevented till the anodized film is dissolved away. Therefore, a local cell reaction is unlikely to occur.

Figure 12:
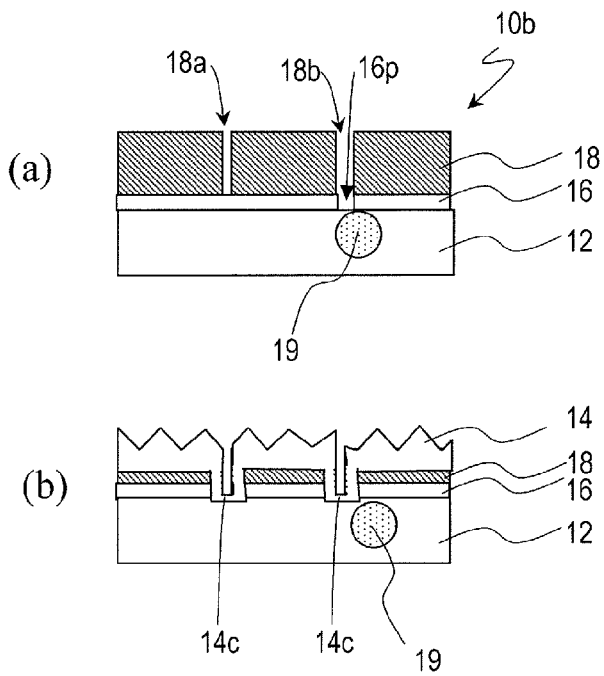
FIG. 12 (*a*) is a schematic diagram of a mold base 10*b*. (*b*) is a schematic diagram showing a state of the mold base 10*b* after anodization is performed.

If, as shown in FIG. 12(a), the aluminum film 18 has vacancies 18a and 18b between crystal grains, the inorganic material layer 16 has a pinhole 16p, and the vacancy 18b between crystal grains and the pinhole 16p overlap each other in terms of the thickness direction of the mold base 10b, the surface of the aluminum base 12 is partially exposed. If there is an impurity in part of the surface of the aluminum base 12 lying under a portion where the vacancy 18b between crystal grains and the pinhole 16p overlap each other, the etching solution comes into contact with the impurity in the etching step. Therefore, there is a probability of occurrence of a local cell reaction. In the anodization step, exposed part of the aluminum base 12 (i.e., part of the aluminum base 12 near the pinhole 16*p*) is brought into contact with the electrolytic solution and is therefore anodized, so that an anodized film 14*c* is formed in this part as shown in FIG. 12(*b*). Thus, in the etching step, the etching solution would not come into contact with the impurity 19 till the anodized film 14*c* is dissolved into the etching solution. As a result, a local cell reaction is unlikely to occur.

The mold 100*b* has an advantage that the inorganic material layer 16 can be used as an etch stop layer, and therefore, rework is relatively easy.

Figure 11:
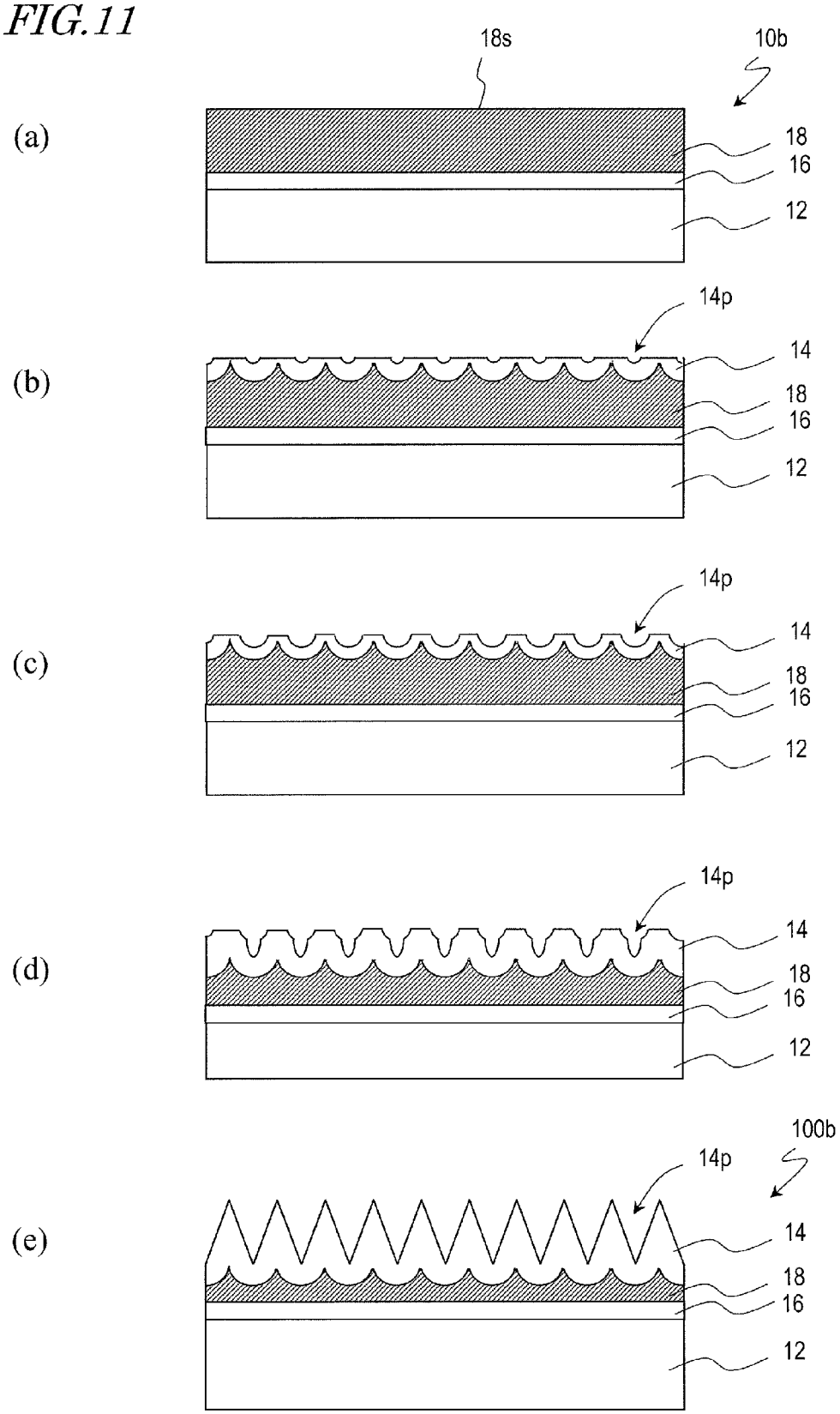
FIG. 11 (*a*) to (*e*) are schematic diagrams for illustrating another mold manufacturing method of an embodiment of the present invention.

First, the mold 100*b* is immersed in the etching solution (e.g., a sodium hydroxide aqueous solution, concentration: 10%, solution temperature: 20° C.), whereby the aluminum film 18 (the aluminum film 18 remaining between the inorganic material layer 16 and the porous alumina layer 14 (FIG. 11(*e*))) is dissolved away. Here, the inorganic material layer 16 serves as an etch stop layer so that the aluminum base 12 remains undissolved.

Then, another new aluminum film is deposited on the inorganic material layer 16, and a surface of the aluminum film is anodized, whereby the mold is reworked.

For example, in the case of reworking the previously-described mold 100 (FIG. 1(*e*)), the porous alumina layer 14 is removed by cutting away. The mold 100*b* is readily reworkable as compared with the mold 100.

The mold 100*b* also has another advantage that it can be reworked many times without renewing the aluminum base 12. For example, a moth-eye mold which is manufactured by anodizing and etching a surface of an aluminum base is usually reworked by cutting away a porous alumina layer at the surface. Therefore, the size of the aluminum base decreases every time rework is performed. Thus, the number of times of rework is limited.

The thickness of the inorganic material layer 16 is preferably not less than 500 nm. As will be described later with examples, when the thickness of the inorganic material layer 16 is not less than 500 nm, insulation between the aluminum base 12 and the aluminum film 18 can readily be obtained. When insulation is achieved between the aluminum base 12 and the aluminum film 18, a local cell reaction is unlikely to occur.

The surface of the aluminum base 12 is preferably a surface cut with a bit. If, for example, abrasive particles are remaining on the surface of the aluminum base 12, conduction will readily occur between the aluminum film 18 and the aluminum base 12 in a portion in which the abrasive particles are remaining. Not only in the portion in which the abrasive particles are remaining but also in a portion which has a roughened surface, conduction readily occurs between the aluminum film 18 and the aluminum base 12. When conduction occurs between the aluminum film 18 and the aluminum base 12, there is a probability that a local cell reaction will occur between an impurity in the aluminum base 12 and the aluminum film 18. When the surface is a surface cut with a bit, the surface is free from abrasive particles, and the surface condition is relatively good. Therefore, insulation between the aluminum film 18 and the aluminum base 12 can readily be obtained. Thus, a local cell reaction is unlikely to occur.

A mold base which includes a base that is made of a metal other than aluminum may be used instead of the aluminum base 12. The metal base is preferably a base that is made of a valve metal. The "valve metal" is a generic term for metals that are to be anodized. Preferred examples other than aluminum include tantalum (Ta), niobium (Nb), molybdenum (Mo), titanium (Ti), hafnium (Hf), zirconium (Zr), zinc (Zn), tungsten (W), bismuth (Bi), and antimony (Sb). Particularly, tantalum (Ta), niobium (Nb), molybdenum (Mo), titanium (Ti), and tungsten (W) are preferred.

Since the aluminum base 12 is used in the mold base 10*b* which has previously been exemplified, the anodized film 14*c* is formed in exposed part of the surface of the aluminum base 12 in the anodization step as described above. When using a mold base which includes a base that is made of a valve metal as the metal base, an anodized film is formed in part of the surface in the anodization step as in the case of using the mold base 10*b* that includes the aluminum base 12. Note that, since the mold base 10*b* uses the aluminum base 12, the mold base 10*b* has an advantage that a local cell reaction would not occur so long as no impurity is exposed, even if the etching solution comes into contact with the surface of the aluminum base 12.

If, for example, the inorganic material layer has a large thickness and high density such that insulation is achieved between the metal base and the aluminum film, a base which is made of a metal other than the valve metal may be used as the metal base. Even when, for example, a base which is made of stainless steel (e.g., JIS standard SUS) is used as the metal base, a local cell reaction is unlikely to occur so long as insulation is achieved between the stainless steel base and the aluminum film. Note that the weight of the aluminum base 12 is smaller than that of the stainless steel base, for example. Therefore, from the viewpoint of processibility, using the mold base 10*b* which includes the aluminum base 12 is preferred. Also, advantageously, the inorganic material layer 16 of the mold base 10*b* does not need to provide insulation between the aluminum base 12 and the aluminum film 18 and therefore does not need to be a dense film.

Forming a buffer layer which contains aluminum on the inorganic material layer 16 is preferred. The buffer layer functions to improve adhesion between the inorganic material layer 16 and the aluminum film 18. Also, the buffer layer protects the inorganic material layer 16 from acid.

The buffer layer preferably contains aluminum and oxygen or nitrogen. Although the content of oxygen or nitrogen may be constant, it is particularly preferred that the buffer layer has a profile such that the aluminum content is higher on the aluminum film 18 side than on the inorganic material layer 16 side. This is because excellent conformity in physical property values, such as the thermal expansion coefficient, is achieved.

The profile of the aluminum content in the buffer layer along the depth direction may change stepwise or may change continuously. For example, when the buffer layer is formed of aluminum and oxygen, a plurality of aluminum oxide layers are formed such that the oxygen content gradually decreases, in such a manner that an aluminum oxide layer which is closer to the aluminum film 18 has a lower oxygen content, and the aluminum film 18 is formed on the uppermost aluminum oxide layer. In other words, a plurality of aluminum oxide layers are formed so as to have a profile such that the aluminum content is higher on the aluminum film 18 side than on the inorganic material layer 16 side.

By forming a plurality of aluminum oxide layers such that the oxygen content gradually decreases in such a manner that an aluminum oxide layer which is closer to the aluminum film 18 has a lower oxygen content, an aluminum oxide layer which is closer to the aluminum film 18 has a higher thermal expansion coefficient, and an aluminum oxide layer which is closer to the aluminum film 18 has a thermal expansion coefficient which is closer to the thermal expansion coefficient of the aluminum film 18. As a result, the aluminum film 18 formed has a strength to withstand the thermal stress which is caused by repeating the anodization that is performed at a relatively low temperature and the etching that is performed at a relatively high temperature, and has high adhesion property.

For example, in the case where the buffer layer is formed by two aluminum oxide layers, the buffer layer may be configured such that the oxygen content of the aluminum oxide layer on the inorganic material layer 16 side (e.g., on the SiO$_2$ layer side) is not less than 30 at % and not more than 60 at %, the oxygen content of the aluminum oxide layer on the aluminum film 18 side is not less than 5 at % and not more than 30 at %, and the oxygen contents of the two aluminum oxide layers satisfy the above-described relationship.

In the case where the buffer layer is formed by three aluminum oxide layers, for example, the buffer layer may be configured such that the oxygen content of the aluminum oxide layer on the inorganic material layer 16 side is not less than 35 at % and not more than 60 at %, the oxygen content of the middle aluminum oxide layer is not less than 20 at % and not more than 35 at %, the oxygen content of the aluminum oxide layer on the aluminum film 18 side is not less than 5 at % and not more than 20 at %, and the oxygen contents of the three aluminum oxide layers satisfy the above-described relationship. As a matter of course, the buffer layer may be formed by four or more aluminum oxide layers. Note that the oxygen content can be obtained by, for example, X-ray photoelectron spectroscopy (ESCA).

The buffer layer may be formed by, for example, using any of the three methods (1) to (3) described below.

(1) The film is formed by reactive sputtering with the use of a mixture gas of Ar gas and O$_2$ gas and an Al target which contains the oxygen element. Here, the oxygen content in the target is preferably not less than 1 at % and not more than 40 at %. If the oxygen content in the target is less than 1 at %, the effects of oxygen contained in the target are insufficient. If the oxygen content in the target is more than 40 at %, the O$_2$ gas is unnecessary.

(2) The film is formed by reactive sputtering with the use of a pure Ar gas as the sputtering gas and an Al target which contains the oxygen element. Here, the oxygen content in the target is preferably not less than 5 at % and not more than 60 at %. If the oxygen content in the target is less than 5 at %, the amount of oxygen contained in the formed aluminum oxide layer may be insufficient. If the oxygen content in the target is more than 60 at %, the content of the oxygen element in the formed aluminum oxide layer may be excessively high. If the content of the oxygen element in the aluminum oxide layer which is closer to the inorganic material layer 16 is more than 60 at %, the adhesion between the inorganic material layer 16 (SiO$_2$ layer) and the aluminum oxide layer may deteriorate.

(3) The film is formed by reactive sputtering with the use of a pure aluminum target. Here, the flow rate ratio of the Ar gas and the O$_2$ gas of the mixture gas used in the sputtering is, approximately, more than 2:0 and not more than 2:1. If the flow rate ratio of the Ar gas and the O$_2$ gas is more than 2:1, the content of the oxygen element in the formed aluminum oxide layer may be excessively high.

The buffer layer used may be formed by a single aluminum oxide layer. A buffer layer which contains aluminum and nitrogen may also be formed in the same way as that described above. The thickness of the buffer layer is preferably not more than 1 µm from the viewpoint of productivity.

The mold manufacturing method of the embodiment of the present invention is suitably used for manufacture of a mold in the form or a roll. For example, in the moth-eye mold manufacturing process that has previously been described with reference to FIG. 1, an aluminum base 12 in the form of a cylinder is used as the aluminum base 12, and therefore, a moth-eye mold 100 in the form of a roll which includes a porous alumina layer 14 over its surface can be manufactured.

The moth-eye mold in the form of a roll which includes a porous alumina layer over its surface may also be manufactured by, for example, forming an aluminum layer on a flexible polymer film, anodizing a surface of the aluminum layer to form a porous alumina layer, and thereafter, fixing the polymer film onto the perimeter surface of a cylindrical metal pipe. However, since the polymer film is fixed in the form of a roll, the moth-eye mold 100 in the form of a roll which is manufactured according to this method has a seam in its perimeter surface.

On the other hand, in the moth-eye mold manufacturing method that has previously been described with reference to FIG. 1, when the mold base 10 that includes a cylindrical aluminum base 12 is used as described above, the mold is manufactured by anodizing the surface 18s of the aluminum film 18 formed on the surface of the cylindrical aluminum base 12. Therefore, a seamless moth-eye mold 100 in the form of a roll can be obtained. Thus, the moth-eye mold 100 in the form of a roll which is manufactured according to this method enables formation of a moth-eye structure without making any seam. Also, in the moth-eye mold manufacturing method that has previously been described with reference to FIG. 11, when a mold base 10b which includes a cylindrical aluminum base 12 is used as the mold base 10b, a seamless moth-eye mold 100b in the form of a roll can be obtained.

The minute structure of the porous alumina layer 14, for example, the depth of the micropores 14p, the diameter of the micropores 14p, the distance between adjacent micropores (the distance between the centers of adjacent micropores), or the regularity in arrangement of the micropores 14p, varies depending on the type, concentration and temperature of the electrolytic solution, the level of the applied voltage, the duration of the voltage application, etc., and therefore may be adjusted as necessary. To form an antireflection film which has an excellent antireflection property, it is preferred that the two-dimensional size (micropore diameter) of the micropores 14p when viewed in a direction normal to the surface is not less than 10 nm and not more than 500 nm, the distance between adjacent micropores (the distance between the centers of the micropores 14p) is also not less than 10 nm and not more than 500 nm, the depth of the micropores 14p is not less than 100 nm and not more than 500 nm, and the distribution of the micropores 14p has no regularity.

The etching duration is preferably less than 30 minutes as described below. As previously described, when the etching solution comes into contact with an impurity which is present at the surface of the aluminum base 12, there is a probability that a local cell reaction will occur. As previously described with reference to FIG. 5, contact between the etching solution and the aluminum base 12 is prevented so long as the anodized film 14b (FIG. 5(b)) is formed in part of the surface of the aluminum base 12 at which the vacancy 18b between crystal grains is present. If the etching step is performed for a long period of time, the anodized film 14b is dissolved so that the surface of the aluminum base 12 lying under the anodized film 14b is exposed. As a result, the etching solution comes into contact with the surface of the aluminum base 12. If an impurity is exposed at the surface of the aluminum base 12, there is a probability that a local cell reaction will occur. Hereinafter, the experimental results of examination of the etching duration are shown.

As for a porous alumina layer formed by anodizing and etching a surface of a 1 μm thick aluminum film formed on a surface of an aluminum base (JIS 1050 aluminum substrate), the variation with time of the diameter of micropores of the porous alumina layer was examined. For the sake of comparison, as for a 1 μm thick aluminum film formed on a glass substrate, the variation with time of the diameter of micropores of a porous alumina layer was also examined.

Figure 13:
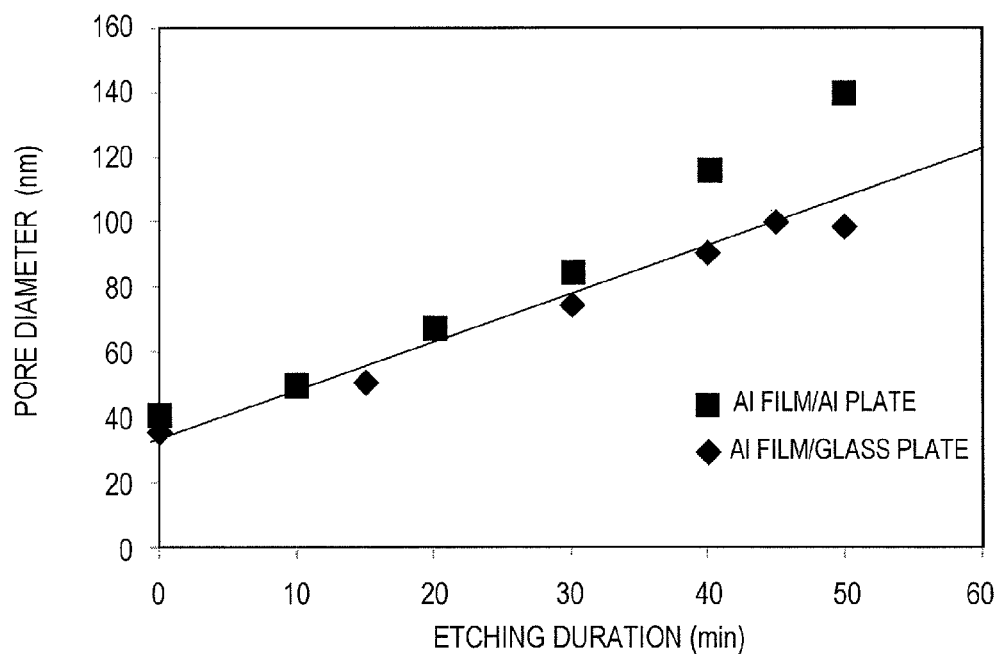
FIG. 13 A graph showing a variation of the diameter of micropores over the etching duration.

The anodization step was performed for 60 seconds with an applied voltage of 80 V using an oxalic acid aqueous solution (concentration: 0.3 wt %, solution temperature: 5° C.) In the etching step, a phosphoric acid aqueous solution (concentration: 1 mol/L, solution temperature: 30° C.) was used. Samples were immersed in the etching solution for the durations shown in Table 1, and the pore diameter was examined by means of SEM. The pore diameters shown in Table 1 are the average values of the diameters of a plurality of micropores which are present at the surface of the aluminum film. FIG. 13 shows a graph of the relationship of the pore diameter to the etching duration shown in Table 1. In FIG. 13, ■ represents the pore diameter of the micropores of the porous alumina layer on the aluminum substrate, and ♦ represents the pore diameter of the micropores of the porous alumina layer on the glass substrate.

TABLE 1

| Etching Duration (min) | Pore Diameter (nm) | |
| --- | --- | --- |
| | Al film/Al substrate | Al film/Glass substrate |
| 0 | 40.4 | 36 |
| 10 | 50.3 | — |
| 15 | — | 50 |
| 20 | 67.5 | — |
| 30 | 84.4 | 75 |
| 40 | 116.1 | 90 |
| 45 | — | 100 |
| 50 | 140.2 | 99 |

As seen from FIG. 13, when the etching duration was less than 30 minutes, the difference in the pore diameter of the micropores between the porous alumina layer formed on the aluminum substrate and the porous alumina layer formed on the glass substrate was small. When the etching was performed for 30 minutes or longer, the difference in the pore diameter increased. It is inferred that, when the porous alumina layer formed on the aluminum substrate was etched for 30 minutes or longer, an anodized film formed on the surface of the aluminum substrate (the anodized film 14b schematically shown in FIG. 5(b)) was etched so that the etching solution came into contact with an impurity and caused a local cell reaction. When the etching was performed for 40 minutes or longer, the pore diameter of the porous alumina layer formed on the aluminum substrate abruptly increased. It is inferred that the exposed impurity increased. It is appreciated that, when the etching is performed for 30 minutes or longer, the pore diameter increases as the etching duration increases. It is seen from the above examination that, from the viewpoint of preventing occurrence of a local cell reaction, the etching duration is preferably less than 30 minutes.

Figure 14:
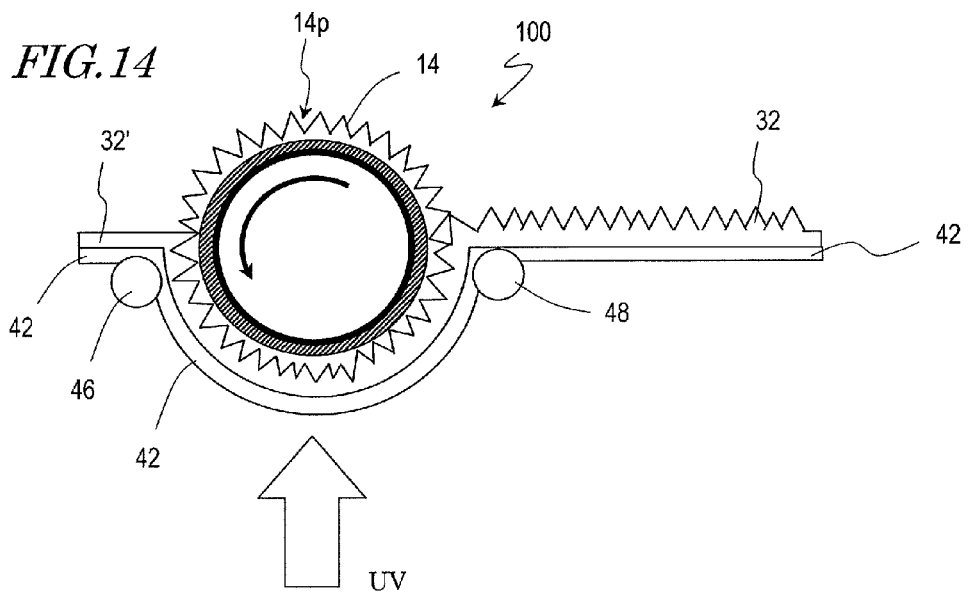
FIG. 14 A schematic cross-sectional view for illustrating the process of producing an antireflection film using a moth-eye mold in the form of a roll.

Next, an antireflection film production method of an embodiment of the present invention is described with reference to FIG. 14. FIG. 14 is a schematic cross-sectional view for illustrating a method for producing an antireflection film according to a roll-to-roll method.

Firstly, a moth-eye mold 100 in the form of a roll is provided. Note that the moth-eye mold 100 in the form of a roll may be manufactured according to, for example, the moth-eye mold manufacturing method which has previously been described with reference to FIG. 1, in which the mold base 10 used includes a cylindrical aluminum base 12 as the aluminum base 12.

Then, as shown in FIG. 14, a work 42 over which a UV-curable resin 32' is applied on its surface is maintained pressed against the moth-eye mold 100, and the UV-curable resin 32' is irradiated with ultraviolet (UV) light such that the UV-curable resin 32' is cured. The UV-curable resin 32' used may be, for example, an acrylic resin. The work 42 may be, for example, a TAC (triacetyl cellulose) film. The work 42 is fed from an unshown feeder roller, and thereafter, the UV-curable resin 32' is applied over the surface of the work 42 using, for example, a slit coater or the like. The work 42 is supported by supporting rollers 46 and 48 as shown in FIG. 14. The supporting rollers 46 and 48 have rotation mechanisms for carrying the work 42. The moth-eye mold 100 in the form of a roll is rotated at a rotation speed corresponding to the carrying speed of the work 42 in a direction indicated by the arrow in FIG. 14.

Thereafter, the moth-eye mold 100 is separated from the work 42, whereby a cured material layer 32 to which an uneven structure of the moth-eye mold 100 (inverted moth-eye structure) is transferred is formed on the surface of the work 42. The work 42 which has the cured material layer 32 formed on the surface is wound up by an unshown winding roller.

Next, the mold manufacturing method of the embodiment of the present invention is described in more detail with illustration of inventive examples and a comparative example.

EXAMPLES 1 to 5

In Examples 1 to 5, a moth-eye mold was manufactured according to the moth-eye mold manufacturing method which has previously been described with reference to FIG. 1. Also, an antireflection film was produced using the moth-eye mold. The reflectance of the produced antireflection film was examined.

First, a mold base was provided which included an aluminum base and an aluminum film formed on the surface of the aluminum base. In Examples 1 to 3, a mold base was provided which included a JIS 1050 aluminum substrate (5 cm×5 cm, thickness: 2 mm) that has a buffed surface, and a 1 μm thick aluminum film that was formed on a surface of the aluminum substrate by EB evaporation. In Example 4, a mold base was provided which included an aluminum pipe (diameter: 150 mm, thickness: 2 mm) that is made of an Al—Mg—Si based alloy (JIS 6063, Si: 0.4%, Mg: 0.5%) and that has a surface cut with a bit, and a 1 μm thick aluminum film that was formed on a surface of the aluminum pipe by sputtering. In Example 5, a mold base was provided which included an aluminum pipe (diameter: 150 mm, thickness: 0.3 mm) that is made of an Al—Mg based alloy (JIS 5052, Mg: 2.6%, chromium (Cr): 0.2%) and that has a surface as rolled, and a 1 μm thick aluminum film that was formed on a surface of the aluminum pipe by sputtering.

Then, anodization was performed using oxalic acid at the concentration of 0.3 wt %. In Examples 1 to 3, the anodization was performed for 55 seconds at the solution temperature of 5° C. In Examples 4 and 5, the anodization was performed for 37 seconds at the solution temperature of 15° C. The applied voltage was 80 V.

Then, etching was performed using a phosphoric acid aqueous solution (concentration: 1 mol/L, solution temperature: 30° C.). In Examples 1, 2, 3, 4, and 5, the etching durations were 20 minutes, 25 minutes, 30 minutes, 29 minutes, and 20 minutes, respectively.

The anodization and the etching were alternately repeated through 5 cycles (including 5 anodization cycles and etching cycles) under the above conditions in order to manufacture a moth-eye mold. The manufactured moth-eye mold was examined as to whether or not the mold had pits and whether or not the micropores had a variation in diameter or depth. As for the variation in diameter or depth of the micropores, a surface SEM image was observed to examine whether or not the micropores had a variation which is attributed to crystal grains and a variation which is attributed to cutting traces or polishing traces.

Antireflection films were produced using the moth-eye molds of Examples 1, 2, and 4, and their reflectances were measured. The wavelength dependence of the reflectance was examined for the band of 380 nm to 740 nm using the spectrocolorimeter CM2600d manufactured by KONICA MINOLTA HOLDINGS, INC. Table 2 shows the reflectances at the measurement wavelength of 550 nm.

TABLE 2

| | Example | | | | |
|---|---|---|---|---|---|
| | 1 | 2 | 3 | 4 | 5 |
| Aluminum base | Al substrate | Al substrate | Al substrate | Al pipe | Al pipe |
| Surface processing method | buffing | buffing | buffing | bit cutting | — |
| Base material | JIS 1050 | JIS 1050 | JIS 1050 | JIS 6063 | JIS 5052 |
| Film formation method | EB evaporation | EB evaporation | EB evaporation | sputtering | sputtering |
| Electrolytic solution temperature (C.°) | 5 | 5 | 5 | 15 | 15 |
| Anodization duration (sec) | 55 | 55 | 55 | 37 | 37 |
| Etching duration (min) | 20 | 25 | 30 | 29 | 20 |
| Pits | ○ | ○ | X | ○ | ○ |
| Variation due to crystal grain | ○ | ○ | ○ | ○ | ○ |
| Variation due to polishing traces/cutting traces | X | X | X | ○ | X |
| Reflectance (%) | 0.4 | 0.7 | — | 0.4 | — |

As seen from Table 2, no pits were formed in the moth-eye molds of Examples 1, 2, 4, and 5. On the other hand, in Example 3, pits were formed in the surface of the moth-eye mold. In the anodization step, it is inferred that, an anodized film (the anodized film 14*b* schematically shown in FIG. 5(*b*)) was formed in part of the surface of the aluminum base lying under a vacancy between crystal grains of the aluminum film. In Example 3, the etching duration was long, and it is therefore inferred that the anodized film was dissolved. Accordingly, the etching solution came into contact with an impurity, and a local cell reaction occurred.

In the moth-eye mold of Example 4, the micropores have no variation. On the other hand, in the moth-eye molds of Examples 1 to 3 and 5, the micropores did not have a variation which was attributed to crystal grains such as shown in FIG. 8. However, over the surfaces of the moth-eye molds of Examples 1 to 3, the micropores were formed along polishing traces. Over the surface of the moth-eye mold of Example 5, the micropores were formed along rolling traces. When using a mold base which includes an aluminum base cut with a bit as in Example 4, the micropores are prevented from having a variation as compared with a case of using a mold base which includes a buffed aluminum base and a case of using a mold base which includes an aluminum base with a surface as rolled.

Figure 15:
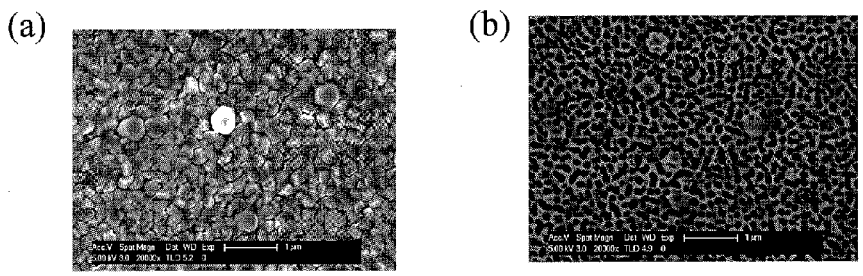
FIG. 15 (*a*) is a SEM image of a surface of an aluminum film of Example 4. (*b*) is a SEM image of a surface of a moth-eye mold of Example 4.

FIG. 15(*a*) is a SEM image of the surface of the aluminum base of Example 4. FIG. 15(*b*) is a SEM image of the surface of the moth-eye mold of Example 4. As seen from FIG. 15(*a*) and FIG. 15(*b*), the surface of the aluminum base of Example 4 had a plurality of crystal grains with the diameter of about several hundreds of nanometers, and there was a vacancy between crystal grains (FIG. 15(*a*)). However, even though the anodization and the etching were performed, no pits were formed, and micropores were formed uniformly over the entire surface (FIG. 15(*b*)).

Figure 16:
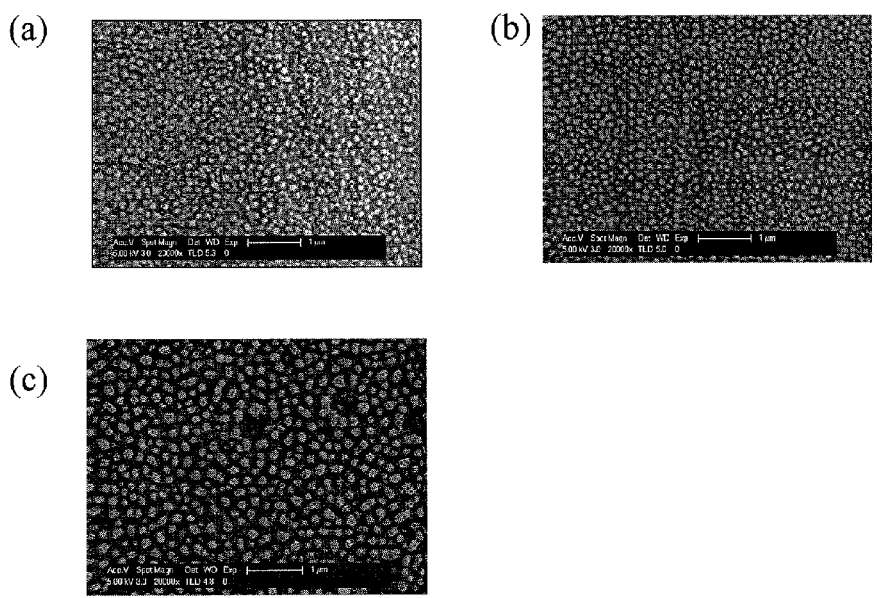
FIG. 16 (*a*) to (*c*) are SEM images of surfaces of antireflection films of Examples 1, 2, and 4, respectively.
Figure 17:
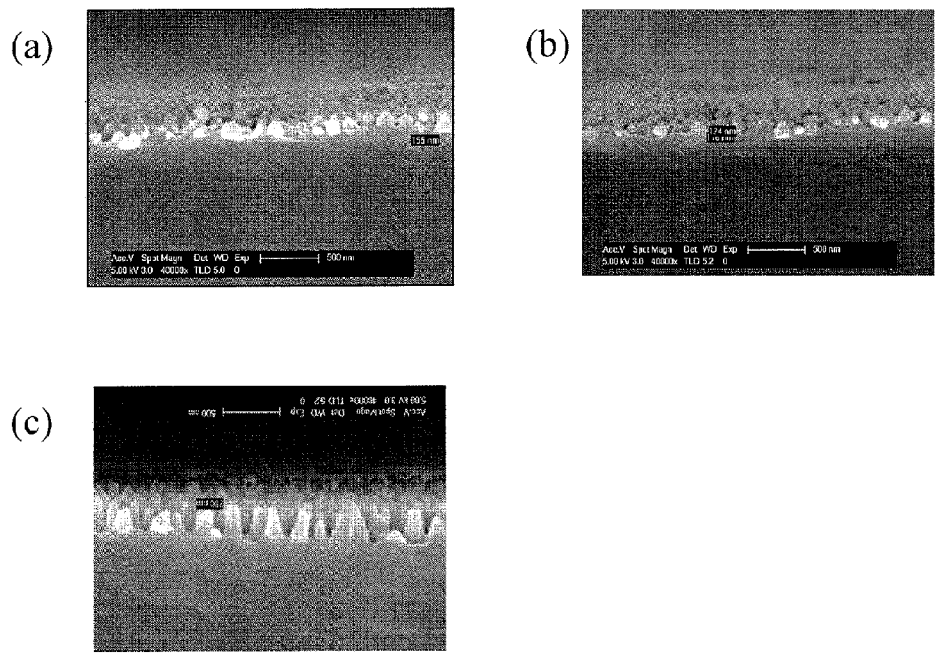
FIG. 17 (*a*) to (*c*) are SEM images of cross sections of the antireflection films of Examples 1, 2, and 4, respectively.

FIGS. 16(*a*) to 16(*c*) are SEM images of the surfaces of the antireflection films of Examples 1, 2, and 4, respectively. FIGS. 17(*a*) to 17(*c*) are SEM images of cross sections of the antireflection films of Examples 1, 2, and 4, respectively. As seen from FIGS. 16(*a*) to 16(*c*), in the antireflection films of Examples 1, 2, and 4, a plurality of protrusions were formed over the entire surface, and the protrusions had a base whose diameter was about several hundreds of nanometers. As seen from FIGS. 17(*a*) to 17(*c*), the height of the plurality of protrusions formed in the surfaces of the antireflection films of Examples 1, 2, and 4 was about several hundreds of nanometers.

As seen from comparison of FIGS. 16(*a*) to 16(*c*), the protrusions of the surfaces of the antireflection films of Examples 1, 2, and 4 have different base sizes. As seen from comparison of FIGS. 17(*a*) to 17(*c*), the protrusions of the surfaces of the antireflection films of Examples 1, 2, and 4 have different heights and different shapes. Among Examples 1, 2, and 4, the anodization conditions and the etching conditions were different, and the size and shape of the micropores of the moth-eye molds were different. Thus, it is inferred that the size and shape of the plurality of transferred protrusions were different.

In the central region of FIG. 16(*b*), protrusions were observed as being linearly aligned. It is inferred that the protrusions in this region were the results of transfer of the micropores that were formed to be arranged along the polishing traces that have previously been described.

Figure 18:
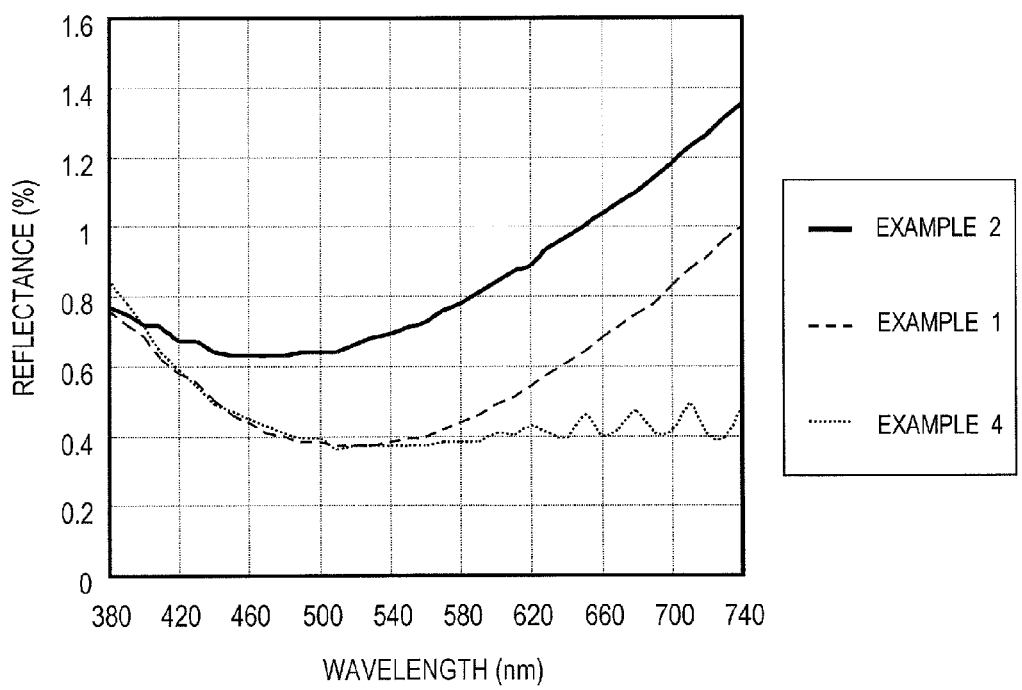
FIG. 18 A graph showing the wavelength dependence of the reflectance of the antireflection films of Examples 1, 2, and 4, respectively.

FIG. 18 shows a graph of the wavelength dependence of the reflectance of the antireflection films of Examples 1, 2, and 4, which are represented by a broken line, a solid line, and a dotted line, respectively. As seen from FIG. 18, in each of Examples 1, 2, and 4, the reflectance was not more than 1.4% over the entire measurement wavelength band (380 nm to 740 nm). Particularly, in each of Examples 1 and 4, the reflectance of the antireflection film was not more than 1.0% over the entire measurement wavelength band. In Examples 1, 2, and 4, the reflectances of the antireflection films for light at about 550 nm were 0.4%, 0.7%, and 0.4%, and thus, these antireflection films exhibited excellent antireflection properties. Now, Example 1 and Example 4 are compared. In Example 1, the reflectance increased as the measurement wavelength increased in the band of not less than 550 nm, and the reflectance was about 1.0% at 740 nm. In Example 4, the reflectance was about 0.4% to 0.5% in the band of 550 nm to 740 nm. Thus, the antireflection film of Example 4 had better antireflection properties.

Example 6

In Example 6, a moth-eye mold was manufactured according to the method that has previously been described with reference to FIG. 11.

First, a mold base was provided. The mold base included an aluminum pipe (diameter: 150 mm, length: 500 mm) which was made of an Al—Mg—Si based alloy (JIS 6063), a 100 nm thick $SiO_2$ layer which was formed on the surface of the aluminum pipe by sputtering, a 300 nm thick aluminum oxide layer which was formed on the surface of the $SiO_2$ layer, and a 1 μm thick aluminum film which was formed on the surface of the aluminum oxide layer.

Then, the anodization step and the etching step were alternately performed through 5 cycles (including 5 anodization cycles and 4 etching cycles). The anodization step was performed for 50 seconds with an applied voltage of 80 V using an oxalic acid aqueous solution (concentration: 0.3 wt %, solution temperature: 18° C.). The etching step was performed for 29 minutes using a phosphoric acid aqueous solution (concentration: 1 mol/L, solution temperature: 30° C.).

The surface of the resultant moth-eye mold was examined, and it was found that no pits were formed.

Example 7

In Example 7, a mold base which includes a metal base in place of the aluminum base was used to manufacture a moth-eye mold according to the method that has previously been described with reference to FIG. 11.

First, a mold base was provided. The mold base included a metal base (a square stainless steel substrate of cm on each side), an inorganic material layer (a $Ta_2O_5$ layer having a thickness of 500 nm) which was formed on the substrate by sputtering, and a 1 μm thick aluminum film which was formed on the surface of the $Ta_2O_5$ layer by sputtering.

Then, the anodization step and the etching step were alternately performed through 5 cycles (including 5 anodization cycles and 4 etching cycles). The anodization step was performed for 37 seconds with an applied voltage of 80 V using an oxalic acid aqueous solution (concentration: 0.3 wt %, solution temperature: 18° C.). The etching step was performed for 29 minutes using a phosphoric acid aqueous solution (concentration: 1 mol/L, solution temperature: 30° C.)

The insulation property of the mold base used in Example 7 was examined. It was examined using a tester whether or not there is conduction between the front surface of the aluminum film and the rear surface of the stainless steel substrate, and it was found that no conduction occurred.

No pits were formed in the surface of the resultant moth-eye mold. It is inferred that the fact that the mold base used in Example 7 had successful insulation between the aluminum film and the stainless steel substrate was one of the reasons that no pits were formed.

Another mold base was also prepared which was the same as the mold base of Example 7 except that the inorganic material layer was a 300 nm thick $Ta_2O_5$ layer. It was examined whether or not there is conduction, and it was found that conduction occurred between the stainless steel substrate and the aluminum film. It is inferred that the fact that the thickness of the inorganic material layer was relatively small was one of the reasons.

Still another mold base was prepared by forming a 300 nm thick $Ta_2O_5$ layer and a 1 μm thick aluminum film on a stainless steel pipe (diameter: 150 mm, length: 400 mm) instead of the stainless steel substrate. It was examined whether or not there is conduction, and it was found that conduction occurred between the stainless steel pipe and the aluminum film. Still other mold bases were prepared by forming a 100 nm thick $SiO_2$ layer, a 500 nm thick $Ta_2O_5$ layer, and a 1 μm thick $Ta_2O_5$ layer on a surface of a stainless steel pipe. In each of these mold bases, it was also found that conduction occurred. The stainless steel pipe has a relatively large surface area. When the mold base including the stainless steel pipe was used, the inorganic material layer formed had a relatively large area. Thus, it is inferred that, many pinholes were formed in the inorganic material layer, so that conduction occurred.

Comparative Example 1

In Comparative Example 1, a moth-eye mold was manufactured by performing anodization and etching directly on a surface of an aluminum base. In Comparative Example 1, the same aluminum plate as those of Examples 1 to 3 was used as the aluminum base. The anodization conditions (the solution temperature and the anodization duration) were also the same as those of Examples 1 to 3. The etching conditions were the same as those of Example 2. The anodization and the etching were alternately repeated through 5 cycles (including 5 anodization cycles and 4 etching cycles), whereby a moth-eye mold was manufactured.

In the moth-eye mold of Comparative Example 1, pits were formed. It is inferred that, in the etching step, a local cell reaction occurred between an impurity contained in the aluminum base and an aluminum portion surrounding the impurity. Over the surface of the moth-eye mold of Comparative Example 1, micropores on the left side of the crystal grain boundary and micropores on the right side of the crystal grain boundary had different diameters and different depths as previously described with reference to FIG. 8. Also, over the surface of the moth-eye mold of Comparative Example 1, micropores were formed along polishing traces.

The above descriptions are provided with examples of manufacture of a moth-eye mold, although a mold manufacturing method of an embodiment of the present invention is also applicable to manufacture of a non-motheye mold which has a porous alumina layer over its surface. For example, the present invention is applicable to manufacture of a mold which is used for production of a photonic crystal.

INDUSTRIAL APPLICABILITY

A mold of the present invention can be used as a mold for production of an antireflection film, a photonic crystal, etc.

REFERENCE SIGNS LIST

10, 10b mold base
12 aluminum base
14 porous alumina layer
14p micropore (minute recessed portion)
16 inorganic material layer
18 aluminum film
18s surface of aluminum film
100, 100b mold

The invention claimed is:
1. A method for manufacturing a mold which has a porous alumina layer over its surface, comprising the steps of:
(a) providing a mold base which includes a metal base, an inorganic material layer provided on a surface of the metal base, and an aluminum film deposited on the inorganic material layer, the aluminum film having a purity of not less than 99.99 mass %;

(b) after step (a), anodizing a surface of the aluminum film to form a porous alumina layer which has a plurality of minute recessed portions; and (c) after step (b), bringing the porous alumina layer into contact with an etching solution to enlarge the plurality of minute recessed portions of the porous alumina layer.

2. The method of claim 1, wherein the metal base is an aluminum base.

3. The method of claim 1, wherein the step (b) includes, when the aluminum film has a vacancy between crystal grains, the inorganic material layer has a pinhole, and the vacancy between crystal grains and the pinhole overlap each other in terms of a thickness direction, anodizing part of the surface of the metal base lying under the vacancy between crystal grains and the pinhole, thereby forming an anodized film in the part.

4. The method of claim 1, wherein the inorganic material layer has a thickness of not less than 500 nm.

5. The method of claim 1, wherein the surface of the metal base is a surface cut with a bit.

6. The method of claim 1, wherein the metal base has a cylindrical shape.

7. The method of claim 1, wherein
the porous alumina layer has a plurality of recessed portions whose two-dimensional size viewed in a direction normal to its surface is not less than 50 nm and less than 500 nm,
the method further comprises, after step (c), the step (d) of further performing anodization to grow the plurality of minute recessed portions, and
after step (d), step (c) and step (d) are further performed.

8. The method of claim 1, wherein the mold base further comprises a buffer layer provided on the inorganic material layer, the buffer layer containing aluminum.

9. The method of claim 8, wherein a thickness of the buffer layer is not more than 1 μm.

10. The method of claim 8, wherein the buffer layer contains aluminum and either of oxygen or nitrogen.

11. The method of claim 10, wherein the buffer layer has such a profile that a content of the aluminum is relatively higher in a portion which is relatively closer to the aluminum film than in another portion which is relatively closer to the inorganic material layer.

12. The method of claim 10, wherein the buffer layer comprises a plurality of aluminum oxide layers.

* * * * *